United States Patent Office 3,008,917
Patented Nov. 14, 1961

3,008,917
COATING MIXTURE CONTAINING DIISOCYANATE MODIFIED POLYESTER AND STYRENE
Robert E. Park, New Kensington, and Dart L. Ridenour, Oakmont, Pa., assignors to Pittsburgh Plate Glass Company, Allegheny County, Pa., a corporation of Pennsylvania
No Drawing. Filed Aug. 27, 1956, Ser. No. 606,210
3 Claims. (Cl. 260—45.4)

This invention relates to polyesters of polyhydric alcohols and dicarboxylic acids containing alpha-beta ethylenic groups or to interpolymerizable mixtures thereof with monomers containing $>C=CH_2$ groups and it has particular relation to polyesters and mixtures thereof with monomers which are adapted to cold cure even in the presence of atmospheric oxygen.

Valuable resinifiable materials have heretofore been prepared by the mixing of monomers containing $>C=CH_2$ groups with polyesters of polyhydric alcohols such as dihydric alcohols and dicarboxylic acids at least a portion of which are alpha-beta ethylenically unsaturated. Usually the polyesters employed in such mixtures have been carried to a state of esterification in which they are very viscous or even solid, but are still fusible and soluble in solvents such as aromatic hydrocarbons. The monomers are usually liquid compounds comprising a negative group attached to the $>C=CH_2$ group and are soluble in the polyester component to provide liquid mixtures. Such mixtures, in the absence of atmospheric oxygen or when moderately heated, polymerize very rapidly to a hard, thermoset state.

Many such interpolymerizable mixtures are disclosed in the prior art, for example in Parker Patents 2,593,787 and 2,676,947 and others.

The interpolymerizable mixtures are excellently adapted for use in forming castings, or for use in impregnating or coating fabrics to form laminates. This is especially true in those instances where the materials can be cured without exposure to air or oxygen as for example in molds or under the protection of a sheet member such as a sheet of cellophane or where they can adequately be heated or baked. However, the materials are not well adapted for use in the coating or impregnating art where they are spread as thin films upon surfaces to be coated, such as wood, concrete, stone; metal or the like, and are cured at low or moderate temperatures, for example at atmospheric temperatures, because the atmosphere strongly retards, or even prevents the curing reaction so that the films, contrary to what would naturally be expected, remain soft and tacky for very long periods of time.

In order to obviate this characteristic and to provide interpolymerizable mixtures of polyesters and monomers useful for coating purposes, waxes, such as paraffin wax, have been added to the liquid mixtures in minute amounts. These waxes are relatively incompatible with the resin mixtures and when the latter are applied to surfaces to be coated, the wax tends to migrate to the surface to form an exceedingly thin film which reduces the contact of the surface with air or oxygen to a sufficient degree to allow the interpolymerizable mixture to set up or gel satisfactorily within a relatively short period of time even when cold.

This invention is based upon the discovery that if the polyester component of the foregoing interpolymerizable mixtures are modified by the incorporation of an isocyanate containing a plurality of isocyanate groups, they may be incorporated with $>C=CH_2$ monomers to provide coating media which when spread, will quickly set up or harden even at room temperatures and in contact with the atmosphere in the absence of paraffin wax or other incompatible component in the mixture.

It is a further feature that the resultant resins are of high gloss, are of highly cross-linked internal structure and they are substantially improved in adhesion to many substances, such as steel, stone, concrete, wood, rubber, plastics, etc. They may be used in forming coatings, castings, laminates, adhesives, and for other applications.

A polyester which may be employed in the practice of this invention may be assumed to be of the generalized structure:

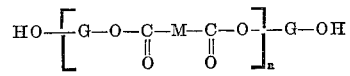

where G is the organic interconnecting chain of a glycol and being represented by $$-CH_2CH_2-$$

$$-CH_2CH_2-O-CH_2CH_2-$$

$$-CH_2CH_2CH_2-$$

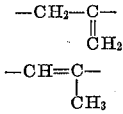

and the like; M is preferably —CH=CH— as in maleic or fumaric acid,

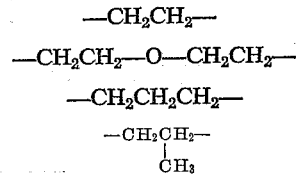

as in itaconic, citraconic or mesaconic acid; $n$ is a whole number, usually above 2 and probably below 20. In any event, the molecular chain of parenthetical units is not so great as to form an insoluble polyester molecule.

A number of reactions can be expected when the polyester is mixed with a diisocyanate of the formula:

$$O=C-N-R-N-C=O$$

where R is hydrocarbon. Some of the reactions may be represented as follows:

EQUATION 1

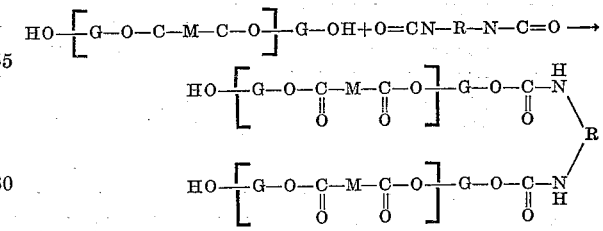

This reaction is greatest where only a small amount of diisocyanate is present.

EQUATION 2

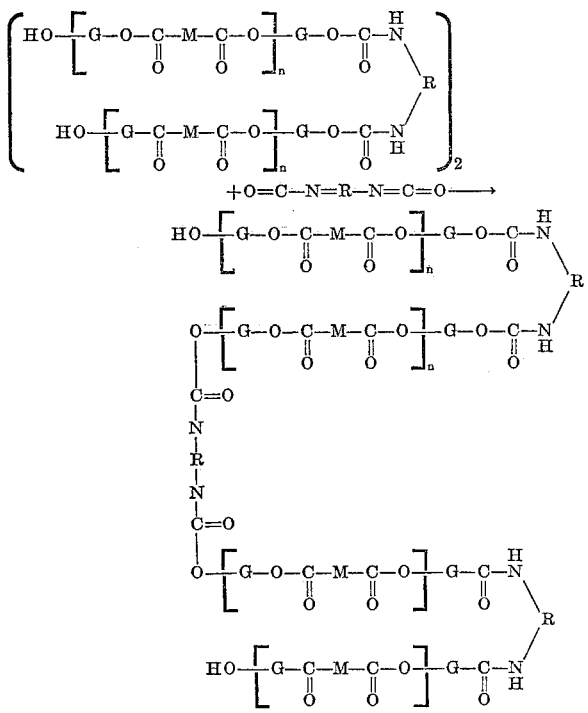

This reaction is greatest where the diisocyanate is present in a larger amount.

A still further reaction involving larger amounts of diisocyanate and a higher temperature is represented by the equation:

EQUATION 3

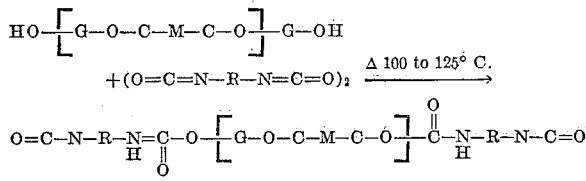

There are probably other reactions, as for example reactions of isocyanate groups with available carboxyls, some of which probably remain in the polyester. However, the foregoing reactions are representative and are probably the main ones. Further representations by equations are not deemed to be necessary.

The polyesters employed in the forming of the compositions of the present invention preferably comprise as the polyhydric alcohol component a glycol, such as ethylene glycol, diethylene glycol, propylene glycol, dipropylene glycol, trimethylene glycol or the like. The polyhydric alcohol component may also include certain amounts (for example up to 50 percent) of polyethylene glycol such as polyethylene glycol having a molecular weight averaging within a range of about 1,000 to 4,000. Small amounts of polyhydric alcohols containing more than two hydroxyls per molecule and being represented by glycerol, pentaerythritol, hexane-triol or the like may also be included. Excessive amounts of these usually are to be avoided since the inclusion of such amounts tends to cause the polyesters to set prematurely.

The dicarboxylic acid components of the polyester should comprise at least some alpha-beta ethylenic dicarboxylic acid (or anhydride thereof) and being represented by maleic acid, itaconic acid, fumaric acid, or the like. In most instances, it is preferable that the dicarboxylic acid component include at least some dicarboxylic acids which are free of unsaturation other than that characterizing aromatic nuclei. The latter produce polymerization by esterification reaction only. Such dicarboxylic acids include:

Phthalic acid
Terephthalic acid
Isophthalic acid
Tetrachlorophthalic acid and such like arylene dicarboxylic acids, as well as dicarboxylic acids of the aliphatic type and comprising:

Succinic acid
Adipic acid
Sebacic acid
Azelaic acid and the like. The proportion of non-ethylenic acid may be zero or it may be as high as 8 or 10 moles per mole of ethylenic dicarboxylic acid, a range of 0.25 to 6 moles of the nonethylenic dicarboxylic acid per mole of the ethylenic acid is suggested. The term acids includes the anhydrides thereof.

The preparation of such polyesters is now well recognized in the art and elaboration thereupon is not deemed to be necessary. It is sufficient to state that they can conveniently be prepared by mixing the polyhydric component and the dibasic acid or acids substantially in excess of stoichiometric ratio with respect to each other, e.g. 2 to 40 percent excess of the polyhydric alcohol component. In cooking the mixture, a small amount of xylene or other non-reactive solvent medium adapted to distill azeotropically with water is usually added. The mixture is heated in a pot or kettle preferably with agitation, to distill off water and medium, the water being separated and the medium being returned to the reaction zone. The reaction is continued until the acid value has been reduced to a sufficient point, as for example, below about 60 and may be much lower, as for example below 45 or even down to zero or near thereto. The hydroxyl value usually falls in a range of about 25 to 600. In any event, the esterification reaction is stopped before the polyester becomes infusible and insoluble and while it still contains polymerizable ethylenic groups residual from the alpha-beta ethylenic dicarboxylic acid.

The present invention contemplates the use of various isocyanate compounds containing a plurality of isocyanate groups. Typical compounds of this class comprise:

Ditolylene diisocyanate
Chlorophenyl-2,4-diisocyanate
Ethylene diisocyanate
1,4-tetramethylene diisocyanate
p-Phenylene diisocyanate
Tolylene diisocyanate (usually as mixed isomers)
Dianisidine diisocyanate
p,p'-Diisocyanato-diphenylmethane
Hexamethylene diisocyanate, and others.

Because of availability and generally satisfactory behavior, the tolylene diisocyanate mixed isomers are at the present time preferred and the use thereof is illustrated in the subsequent examples. Commercial examples of the mixed isomers comprise:

Mondur TD, which is understood to be a mixture comprising 65 percent of 2,4-tolylene diisocyanate and 35 percent of 2,6-tolylene diisocyanate;

Hylene TM, which is understood to be a mixture of 80 percent 2,4-tolylene diisocyanate and 20 percent of 2,6-tolylene diisocyanate;

Hylene TM-65, which is understood to be a mixture of 65 percent 2,4-tolylene diisocyanate and 35 percent 2,6-tolylene diisocyanate;

Mondur C, which is understood to comprise a prepolymer of 3 moles of tolylene diisocyanate and 1 mole of hexane-triol. This prepolymer may be substituted for at least a part of the tolylene diisocyanate.

The diisocyanate component preferably is incorporated with the polyester component before the $>C=CH_2$ monomer is added and the mixture is reacted at a temperature of about 75° C. to 140° C.

The amount of diisocyanate to be reacted with specific polyesters may be calculated by a method subsequently to be described.

The polyester modified by the isocyanate component preferably is incorporated with a monomer such as styrene while it is relatively hot and liquid, as for example, at a temperature of about 75° C. to 150° C. In order to prevent premature gelation of the hot mixture, it is desirable that one or both of the components being mixed, be incorporated with a small amount of a gelation inhibitor. The inhibitor should be free of active hydrogen, otherwise it will tend to react with isocyanate groups. Chloranil which is of the formula:

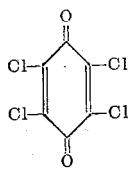

constitutes one of the best gelation inhibitors thus far tested. In those instances where the mixtures of monomer and diisocyanate monomers can be used up at once, the chloranil may be omitted. If the mixture is to be stored for a substantial time, chloranil should be included.

The stability (tank life) of catalyzed mixtures may often be greatly increased without substantially impairing the rate of cure of the films by addition of methyl alcohol to the mixture. This feature will subsequently be discussed in greater detail.

The polyesters after reaction with the diisocyanates are viscous but soluble in $>C=CH_2$ monomers. They contain reactive $C=C-C=O$ groups residual from the alpha-beta ethylenic dicarboxylic acid component and these are adapted to react by addition with $>C=CH_2$ monomers to effect gelation and hardening, even in the presence of atmospheric oxygen. Typical $>C=CH_2$ monomers containing ethylenic groups and being adapted for interpolymerization with the isocyanate modified polyester components of this invention are represented by the following materials.

Styrene
Vinyl toluene
Alpha-methyl styrene
Para-methyl styrene
Divinyl benzene
Amides such as: acrylamide
Unsaturated esters such as:
    Vinyl acetate
    Methyl methacrylate
    Methyl acrylate
    Diallyl phthalate
    Diallyl succinate
    Diallyl adipate
    Diallyl sebacate
    Diethylene glycol
    Diallyl diethylene dicarbonate (C.R. 39)
    Triallyl phosphate
    Vinyl chloride, and others.

Styrene is presently preferred. The monomer components may comprise from about 5 to 45 percent by weight of the combined polyester and monomer component.

The foregoing components (polyester, diisocyanate and monomer) constitute the main components of the interpolymerizable mixtures. The gelation inhibitors have already been referred to. Other components may also be included. For example, catalysts and promoters of gelation or of curing of the interpolymerizable mixture may be added in minor amounts. Conveniently, these catalysts or promoters are added at about the time the interpolymerizable mixture is to be applied, for example, in the coating of a solid surface. Appropriate catalysts comprise such peroxidic catalysts as benzoyl peroxide, cumene hydroperoxide, methyl ethyl ketone peroxide, lauroyl peroxide and others.

A second type of catalyst which may be employed in combination with the peroxidic type includes the so-called driers such as the soluble salts of drier metals, e.g. cobalt, nickel, copper, lead, manganese and the like. These conventionally have heretofore been employed to hasten the drying of paints or varnishes comprising drying oils. Appropriate compounds of this class comprise cobalt naphthanate, cobalt oleate, and the like. Two or more of these driers may be used in combination with each other, if so desired.

In some instances, it is also desirable to incorporate with the interpolymerizable mixture of the diisocyanate modified polyester and the monomer small amounts of surfactants or an organosilicone resin represented by the well-known commercial material sold under the trade name of Silicone 20. This component is optional.

The interpolymerizable mixtures may be employed either with, or without pigmentation as may be desired. Appropriate pigments comprise titanium dioxide and carbon black, however, obviously, other pigments which do not objectionably react with the interpolymerizable mixture are contemplated as being within the scope of the invention. Pigments, if employed, are used in such amounts as will produce a desired degree of opacity or color in the resin composition. The pigments may be incorporated by a conventional grinding operation, such as is well understood in the art of manufacturing paint, varnishes and other coating compositions.

Small amounts of a volatile alcohol, such as methyl alcohol, may also be incorporated into the interpolymerizable mixtures. This alcohol helps maintain a satisfactory tank life permitting mixtures of substantial volume to be made up ahead of time without undue tendency to gel or set before application to the surface to be coated can be made. When the mixture is spread as a film, the alcohol quickly evaporates.

The interpolymerizable mixtures, while in a liquid, anhydrous state, may be applied to various surfaces including surfaces of wood, metals such as iron or steel, stone, concrete, rubber and the like. The interpolymerizable mixtures are especially suitable for use in priming operations as for example in priming of relatively porous surfaces which tend to absorb many coating materials to an objectionable degree. The materials adhere readily to the surfaces and will receive other coating materials as finishes.

The following examples illustrate the application of the principles of the invention.

*Example I*

A series of polyesters was prepared which were mixed products of:

| | Moles |
|---|---|
| Maleic anhydride | 8–19 |
| Phthalic anhydride | 1–12 |
| Propylene glycol | 12.3–19.7 |
| Polyethylene glycol | 5.2–10 |

The final acid number varied in a range of about 25 to 70 with an average of 39.11. The hydroxyl numbers were in a range of 35 to 141, averaging about 64.5. The viscosities at 60 percent solids in monoethyl ether of ethylene glycol were in a range of A+ to K+.

The following constitute the components and the characteristics of the several polyesters of the series:

| Moles of component | | | | Polyester properties | | |
|---|---|---|---|---|---|---|
| Maleic anhydride | Phthalic anhydride | Diethylene glycol | Propylene glycol | FAN[1] | OH | Viscosities |
| 8 | 12 | 6.6 | 19.7 | 25 | 141 | A+ |
| 8 | 12 | 5.6 | 16.4 | 39 | 55 | G+ |
| 8 | 12 | 5.2 | 16.4 | 46 | 63 | E+ |
| 8 | 12 | 5.6 | 16.4 | 39 | 48 | K+ |
| 8 | 12 | 6.6 | 19.7 | 21 | 88 | D+ |
| 8 | 12 | 5.6 | 16.4 | 52 | 42 | D |
| 8 | 12 | 5.6 | 16.4 | 70 | 74 | C |
| 8 | 12 | 5.6 | 16.4 | 35 | 62 | F+ |
| 8 | 12 | 4.9 | 16.4 | 49 | 72 | E+ |
| 16 | 4 | 5.6 | 16.4 | 33 | 35 | F+ |
| 8 | 12 | 4.6 | 16.4 | 47 | 52 | C+ |
| 12 | 8 | 5.6 | 16.4 | 32 | 56 | F+ |
| 16 | 4 | 5.6 | 16.4 | 36 | 60 | J |
| 19 | 1 | 5.6 | 16.4 | 30 | 70 | F+ |
| 18 | 2 | 5.6 | 16.4 | 43 | 61 | F+ |
| 19 | 1 | 5.6 | 16.4 | 32 | 60 | G+ |
| 8 | 12 | 10 | 12.3 | 40 | 61 | E+ |
| 8 | 12 | 6 | 16.6 | 35 | 61 | H+ |
| ------ | ------ | ------ | ------ | [2]39.11 | [2]64.5 | ---- |

[1] FAN=Final acid number.
[2] Average.

All of these polyesters when warm, e.g. at 75° C. to 125° C., may be incorporated into tolylene diisocyanate mixed isomers such at Mondur TD or Hylene TM to produce reactions between the isocyanate groups and the hydroxyls as represented in the preceding equations.

To determine the equivalent weight of the polyester per equivalent weight of polyisocyanate, the hydroxyl values and acid values are determined. The hydroxyl number of the polyester is expressed as the milligrams of KOH required to titrate a gram of sample in which the hydroxyls have been esterified with acetic anhydride. Similarly, the acid value represents the KOH in milligrams required to neutralize the carboxyls of the polyester. These values may be determined in conventional manner. The equivalent weight of polyester may then be calculated by the equation:

$$\text{Equivalent weight} = \frac{56{,}100}{\text{OH value} + \text{acid value}}$$

The validity of this equation for the hydroxyl value can be demonstrated as follows:

1 gram of polyester≎OH value in mg. of KOH
Let X=equivalent weight of polyester
X grams of polyester≎56,100 mg. of KOH
X·OH value=56,100

$$X = \frac{56{,}100}{\text{OH value}}$$

$$\text{Equivalent weight} = \frac{56{,}100}{\text{OH value}}$$

The acid equivalency can be similarly treated. Considering both the acidity and the hydroxyl content of the polyester, the equivalent weight is:

$$\text{Equivalent weight} = \frac{56{,}100}{\text{hydroxyl value} + \text{acid value}}$$

Thus assume the acid value is 21 and the hydroxyl value is 88, the sum is 109. The equivalent weight is therefore equal to 56,100 divided by 109, or 515. The equivalent weight of resin was 515, which is the weight of resin per hydroxyl or carboxyl group. The molecular weight of toluene diisocyanate is 174. Therefore, for each 515 parts by weight of polyester, 174 parts by weight of toluene diisocyanate were added. The additions of diisocyanate were effected at a temperature in a range of about 100° C. to 125° C. (in most instances 125° C.). The diisocyanate may be added to the polyester, or the polyester may be added to the diisocyanate. The latter method results in adducts which are less viscous than those obtained by the first method.

The monomer (styrene) may be added to the polyester-diisocyanate adducts in a ratio of about 10 to 40 percent e.g., 33⅓ percent by weight based upon the mixture.

A typical polyester termed Polyester A, which is very satisfactory for use in the practice of the invention, is of the composition:

| POLYESTER A | Moles |
|---|---|
| Phthalic anhydride | 12 |
| Maleic anhydride | 8 |
| Diethylene glycol | 5.6 |
| Propylene glycol | 16.4 |

The hydroxyl number averaged about 65 and the acid number averages about 40. Preferably, it is free or nearly free of water.

This polyester is made up with tolylene diisocyanate mixed isomers (65 percent of 2,4-tolylene diisocyanate, and 35 percent of 2,6-tolylene diisocyanate).

The composition is:

| | Parts by weight |
|---|---|
| Polyester | 65 |
| Tolylene diisocyanate | 20 |

The adduct products contain molecules of the type described in formulae previously given and still contain —C=C—C=O groups adapted to react with >C=CH$_2$ monomers.

The adduct is then incorporated with styrene and chloranil (stabilizer). The final composition is:

| | Parts by weight |
|---|---|
| Polyester | 65 |
| Tolylene diisocyanate | 20 |
| Chloranil | 0.02 to 0.1 |
| Styrene | 35 |

Catalysts, such as mixtures of organic peroxides, e.g. methyl ethyl ketone peroxide, and driers, such as cobalt naphthanate, may be added in small amounts (e.g. 0.1 to 5 percent by weight based upon the mixture) as well as volatile, non-reactive solvents and thinners may be added.

The mixtures, while free or nearly free of water, may be spread by brushing or other techniques upon iron, steel, stone, concrete, wood, brick, rubber and other materials to provide protective coatings that cure at atmospheric temperature. They may also be cured by baking, if desired. Optionally, they may be incorporated with non-reactive pigments to provide pigmented coatings.

The surfaces constituting substrates, before application of the coatings, should be dry, clean and free of wax, or wax-like constituents. The application may be directly to the supporting surfaces. The films will dry at atmospheric temperatures to a solid, highly adherent state in about 8 to 16 hours. If the surfaces are to be exposed to severe scuffing, as by foot traffic on a floor, it is desirable that they be allowed to stand for at least 24 hours before use. Excessive wear should be avoided for at least one week.

Example II

A series of polyesters, free or nearly free of water, was made up of the following compositions and properties:

| Moles of component | | | | Polyester properties | | |
|---|---|---|---|---|---|---|
| Maleic anhydride | Phthalic anhydride | Diethylene glycol | Synthetic Glycerine | FAN | OH number | Viscosities |
| 15 | ---- | 24 | 6 | 14 | 366 | $Z_1+$ |
| 15 | ---- | 24 | 7 | 15.2 | 449 | $Y+$ |
| 15 | ---- | 24 | 8 | 9.9 | 466 | $Z$ |
| 10 | 5 | 24 | 7 | 20 | 429 | $Z_1+$ |
| 12 | 4 | 19.2 | 8 | 41 | 401 | $Z_4+$ |
| 16 | 4 | 18 | 4 | 24 | 103 | $Y+$ |
| 10 | 5 | 20 | 5 | 18 | 302 | $Z_6$ |
| 10 | 5 | 20 | 3 | 7.9 | 258 | $A-$ |
| 10 | 5 | 20 | 3 | 7.9 | 258 | $A-$ |
| 10 | 5 | 15 | 5 | 29 | 219 | $G+$ |
| 10 | 5 | 24 | 7 | 32 | 45 | $Z$ |
| 10 | 5 | 20 | 10 | 39 | 478 | $Z_3$ |
| 10 | 5 | 24 | 7 | 26 | 439 | $Z+$ |
| 10 | 5 | 24 | 7 | 34 | 462 | $Z_1+$ |
| 10 | 5 | 24 | 7 | 35 | 467 | $Y+$ |
| 5 | 10 | 24 | 7 | 31 | 522.9 | $Z_2+$ |
| 2 | 13 | 24 | 7 | 34.2 | 426.5 | $Z_3+$ |
| 7.5 | 7.5 | 24 | 7 | 27.6 | 437.2 | $Z_2$ |

These polyesters are made up with tolylene diisocyanate mixed isomers as in Example I, the amounts of diisocyanate required to react with the polyesters are calculated by the rule referred to in that example. The diisocyanate, while warm, is incorporated with the polyester samples to provide cross-linked reaction products.

The polyester-diisocyanate reaction products contain reactive C=C—C=O groups and are adapted to react by addition with monomers such as styrene. To this end, mixtures of the polyester-diisocyanate reaction products, styrene and chloranil are prepared, the styrene being present in a ratio of about 33⅓ percent. The chloranil is incorporated as a stabilizer in an amount of about 0.10 part per 110 parts of the total mixture.

The mixtures may be spread as protective coatings upon articles of wood, stone, concrete, steel, rubber or the like. They are cured under atmospheric temperatures to solid, tack-free state. (Mixtures of polyesters and monomers free of isocyanate component under like conditions are inhibited by contact of the film with air.) They may also be baked at a temperature, for example of 100° C. to 200° C., to exepdite curing.

Example III

A further series of polyesters is made up as follows:

| Moles of component | | | Polyester properties | | |
|---|---|---|---|---|---|
| Maleic anhydride | Phthalic anhydride | Diethylene glycol | FAN | OH | Viscosities |
| 12 | 8 | 22 | 34 | 87 | $Z_3+$ |
| 16 | 4 | 22 | 33 | 86 | $A-$ |
| 10 | 5 | 20 | 43 | 166 | $A-$ |
| 10 | 5 | 20 | 20 | 138 | $A$ |
| 10 | 5 | 18 | 38 | 118 | $B+$ |
| 15 | 5 | 22 | 34 | 80 | $D+$ |
| 15 | 5 | 20 | 31 | 42 | $E+$ |
| 15 | 5 | 20 | 29 | 47 | $F+$ |
| 15 | 5 | 20 | 28 | 87 | $T+$ |

These polyesters, when reacted with tolylene diisocyanate mixed isomers as in Example I, provide cross-linked products containing —C=C—C=O groups. The products are incorporated with styrene and chloranil as in Example I.

The mixtures spread as films cold cure in contact with air and at room temperature to adherent, solid, non-tacky state. They are valuable for use in protecting wood, stone, concrete, steel, aluminum, rubber and the like.

Example IV

The polyesters of this series constitute a series of the following characteristics:

| Moles of component | | | | Polyester properties | | |
|---|---|---|---|---|---|---|
| Triethylene glycol | Maleic anhydride | Diethylene glycol | Phthalic anhydride | FAN | OH | Viscosities |
| 10 | 10 | ---- | 5 | 32 | 159 | $A-$ |
| 20 | 10 | ---- | 5 | 38 | 166 | $Z_3+$ |
| 10 | 9 | 9.9 | 9 | 44 | 84 | $B+$ |
| 10 | 13.5 | 9.9 | 4.5 | 50 | 91 | $A+$ |

Example V

A further series of polyesters is prepared comprising trimethylol ethane as a polyhydric component. These polyesters are of the following characteristics:

| Moles of component | | | | Polyester properties | | |
|---|---|---|---|---|---|---|
| Maleic anhydride | Phthalic anhydride | Diethylene glycol | Trimethylol ethane | FAN | OH | Viscosities |
| 16 | 4 | 21 | 1 | 48 | 106 | $D$ |
| 16 | 4 | 20 | 2 | 43 | 132 | $C+$ |

These polyesters are reacted with tolylene diisocyanate mixed isomers as in Example I and are then incorporated with 33⅓ percent of styrene and a small amount of chloranil. The mixture may be applied as coatings to wood, stone, concrete, steel, rubber, and the like, and cold cured to provide protective films.

The curing of the interpolymerizable mixtures as given in the several examples may be expedited by the addition of organic peroxidic compounds in small amounts, e.g. 0.1 to 5 percent by weight based upon the total mixture. Appropriate catalysts comprise methyl ethyl ketone peroxide, cumene hydroperoxide and others.

Appropriate activators or accelerators for use with the peroxidic compounds comprise soluble salts of drier metals and being represented by oleates and naphthanates of such metals as cobalt, nickel, copper, lead, manganese and others. These may be employed in amounts of about 0.001 to 2 percent by weight of metal based upon the interpolymerizable mixture.

In order to improve the "tank life" of the catalyzed mixtures of monomer and diisocyanate modified polyester, methyl alcohol may be added in appropriate amounts, e.g. about 1 to 20 percent by weight based upon the total mixture. This material provides a reasonable tank life, e.g. 1 hour or more even when the concentration of catalyst in the mixture is high. However, when the mixture is spread as films upon a surface, the methyl alcohol quickly flashes off. The catalyst system then becomes effective to produce gelation within a very short time. The methyl alcohol may be added to any of the mixtures in any of the foregoing examples.

Example VI

The polyester of this example corresponds to Polyester A of Example I. The polyester in an amount of 65 parts by weight is mixed at an appropriate temperature with 20 parts by weight of tolylene diisocyanate mixed isomers to provide a polyester, the molecules of which are cross-linked by polyurethane linkages. The cross-linked molecules still contain reactive ethylenic groups. The modified polyester is made up into a composition as follows:

| | Parts |
|---|---|
| Tolylene-modified polyester | 85 |
| Styrene | 45 |
| Methyl alcohol | 14 |
| Chloranil | 0.65 |
| Cobalt naphthenate | 1.4 |

To this composition, a wetting agent such as Silicone 20 in an amount of 0.7 part may also be added but is not always required. The mixture should be agitated thoroughly before application. The mixture is stable, often for more than 6 months at room temperature. The composition may be applied directly and without primer coating to wood, metal, stone, concrete, steel, rubber and the like. The surfaces, before application of the composition, should be dry, free from wax and other materials. The films dry to a state of hardness permitting walking upon the same within a period of about 8 to 16 hours. Customarily, where the films are applied to a floor, they should be allowed to dry for at least a day before exposure to traffic.

The films have good gloss or wear and chip resistance and have good adhesion to the surface beneath. The films may constitute finishing films or they may be covered with subsequent applications of other coating media, if desired.

*Example VII*

This example is designed to provide a control illustrating the improvement in stability obtained by use of the methyl alcohol in the composition of the preceding example.

The polyester of this example corresponds to one of those of Example II and is of high hydroxyl number, namely about 400. The polyester is modified with an equal amount by weight of tolylene diisocyanate mixed isomers in accordance with the provisions of Example I. The modified polyester includes ethylenic groups and is adapted to react with monomers, such as styrene. The interpolymerizable mixture comprises:

| | Parts by weight |
|---|---|
| Polyester | 30 |
| Tolylene diisocyanate | 30 |
| Styrene | 40 |
| Chloranil | 0.3 |

If desired, this mixture may also be further modified by means of a wetting agent such as Silicone 20 in an amount of 2 parts by weight.

This composition, unlike that of Example VI, can not be stored for any substantial time, but must be used immediately. The effect of the methyl alcohol in the composition of Example VI is evident.

*Example VIII*

This example constitutes a further evaluation of the use of methyl alcohol as a stabilizer in a pigmented composition comprising tolylene diisocyanate modified polyesters and styrene as a monomer. The polyester in this example is of the following composition:

| | Moles |
|---|---|
| Phthalic anhydride | 12 |
| Maleic anhydride | 8 |
| Diethylene glycol | 5.6 |
| Propylene glycol | 16.4 |

A polyester diisocyanate interpolymer is prepared comprising:

| | Parts |
|---|---|
| Polyester | 65 |
| Tolylene diisocyanate isomers | 20 |

The mixing is accomplished by the techniques previously described. A monomer-polyester mixture of the tolylene diisocyanate modified polyester and styrene is then made up, comprising:

| | Percent |
|---|---|
| Polyester modified by tolylene diisocyanate | 66⅔ |
| Styrene | 33⅓ |

Inhibitors, such as chloranil, as herein disclosed, may be added.

A pigment paste is also made up comprising a polyester of the composition:

| | Moles |
|---|---|
| Maleic anhydride | 1 |
| Adipic anhydride | 10 |
| Diethylene glycol | 12 |

A paste of this polyester is of the composition:

| | Parts by weight |
|---|---|
| Polyester | 60 |
| Titanium dioxide | 39.4 |
| Carbon black | 0.6 |

The samples of the final coating composition comprise:

| | Grams |
|---|---|
| Mixture of monomer and tolylene diisocyanate modified polyester (as described) | 100 |
| Paste | 15 |

If desired, the mixture may further be treated with a wetting agent such as Silicone 20 in an amount of 1 cc. per 115 grams of the foregoing mixture. The samples of this mixture are catalyzed with methyl ethyl ketone peroxide (MEK) and cobalt naphthanate. Tank life determinations of the mixture with different amounts of catalysts and varying proportions of methyl alcohol are tabulated as follows:

| Methyl alcohol, cc. | (MEK) peroxide, cc. | Cobalt naphthenate, cc. | Tank life |
|---|---|---|---|
| 15 | 1.0 | 1.0 | 2 hours, 15 minutes. |
| 15 | 2.0 | 1.0 | 1 hour. |
| 15 | 2.0 | 2.0 | 45 minutes. |
| (¹) | 2.0 | 2.0 | 7 minutes. |
| 10 | 1.0 | 1.0 | 1 hour, 15 minutes. |
| 5 | 1.0 | 1.0 | 30 minutes. |

¹ Control

It is to be noted that the tank life of the control is far shorter than that of the samples containing methyl alcohol. The improvement in tank life obtained by the incorporation of the methyl alcohol is often highly desirable since it admits of the preparation and application of batches of substantial proportion before they become excessively bodied. The mixtures, when spread as films, dry first by evaporation of the methyl alcohol and then by interpolymerization, to provide tough, adherent coatings which are insoluble in most solvents and are chemically resistant.

Emphasis has been placed upon interpolymers in which the polyester and the diisocyanate are reacted separately before incorporation of the monomer. Such mixtures, when catalyzed, have a much longer tank life than do the mixtures in which the diisocyanate is added to the mixture of polyester and monomer. However, in those instances where the catalyzed mixtures can be used up at once, it is also admissible to incorporate the diisocyanate to the preformed mixture of polyester and monomer. The addition of catalyst system to this mixture produces gelation in a very short time.

Emphasis has been placed upon the use of the mixtures as cold curing coatings. However, they may also be used to impregnate fabrics and mats of fibers of cotton, glass, wood or the like.

They may further be used in forming castings in molds or the like. This is especially true in those instances where it may be desirable to cold cure the mixture. They may thus be used to embed or invest delicate articles such as biological specimens which might be damaged by heat conventionally applied in curing resins.

We claim:
1. A liquid, cold-curing, coating material which is the mixture consisting essentially of (A) the reaction prod- uct of the polyester of (1) a dihydric alcohol of the class consisting of ethylene glycol, diethylene glycol, propylene glycol, dipropylene glycol, trimethylene glycol, and (2) a pair of dicarboxylic acids, one of which is selected from the class consisting of maleic acid, fumaric acid and itaconic acid, and the other of which is selected from the class consisting of phthalic acid, terephthalic acid, isophthalic acid, tetrachlorophthalic acid, succinic acid, adipic acid, sebacic acid and azelaic acid, the acid of the latter class being present in an amount of about 0.25 to about 6 moles per mole of the acid of the first-mentioned class, the dihydric alcohol being present in an amount of about 2 to about 40 percent excess of stoichiometric ratio with respect to the sum of the dicarboxylic acids, the polyester being of an acid value of about 0 to about 60 and a hydroxyl value of about 25 to 600, and (B) an organic polyisocyanate selected from the class consisting of toluene diisocyanate and the prepolymer thereof with hexanetriol, the organic polyisocyanate being employed in an amount of about 1 mole per equivalent weight of the polyester, and (C) styrene, the latter being present in an amount of about 10 to about 40 percent by weight based upon the mixture, the polyester and the polyisocyanate being reacted before the addition of the styrene.

2. The coating material as defined in claim 1 in which the acid from the first-mentioned class is maleic acid and the acid from the second-mentioned class is phthalic acid, the glycol being propylene glycol and the polyisocyanate being tolylene diisocyanate.

3. A liquid, cold-curing, coating material which when spread as a thin film upon a supporting body will cure in contact with air and at room temperature, said material being a mixture consisting essentially of (A) the reaction product of the polyester of (1) a dihydric alcohol of the class consisting of ethylene glycol, diethylene glycol, propylene glycol, dipropylene glycol and trimethylene glycol, and (2) a dicarboxylic acid which is selected from the class consisting of maleic acid, fumaric acid and itaconic acid, the dihydric alcohol being present in an amount of about 2 to about 40 percent excess of stoichiometric ratio with respect to the dicarboxylic acid, the polyester being of an acid value in a range of about 0 to about 60, and a hydroxyl value in a range of about 25 to about 600; (B) an organic polyisocyanate selected from the class consisting of toluene diisocyanate and the prepolymer thereof with hexanetriol, the organic polyisocyanate being employed in an amount of about 1 mole per equivalent weight of polyester; and (C) styrene, the latter being present in an amount of about 10 to about 45 percent by weight based upon the mixture, the polyester and the polyisocyanate being reacted before the addition of the styrene.

References Cited in the file of this patent

UNITED STATES PATENTS

| | | |
|---|---|---|
| 2,591,884 | Simon et al. | Apr. 8, 1952 |
| 2,625,535 | Mastin et al. | Jan. 13, 1953 |
| 2,642,403 | Simon et al. | June 16, 1953 |
| 2,642,410 | Hoppens | June 16, 1953 |
| 2,729,618 | Muller et al. | Jan. 3, 1956 |
| 2,740,743 | Pace | Apr. 3, 1956 |
| 2,780,613 | Rubens | Feb. 5, 1957 |
| 2,801,648 | Anderson et al. | Aug. 6, 1957 |
| 2,813,086 | Robitschek et al. | Nov. 12, 1957 |
| 2,879,248 | Nischk et al. | Mar. 24, 1959 |

FOREIGN PATENTS

| | | |
|---|---|---|
| 696,449 | Great Britain | Sept. 2, 1953 |
| 744,027 | Great Britain | Jan. 25, 1956 |

UNITED STATES PATENT OFFICE
CERTIFICATE OF CORRECTION

Patent No. 3,008,917 November 14, 1961

Robert E. Park et al.

It is hereby certified that error appears in the above numbered patent requiring correction and that the said Letters Patent should read as corrected below.

Column 3, lines 43 to 45, the equation should appear as shown below instead of as in the patent:

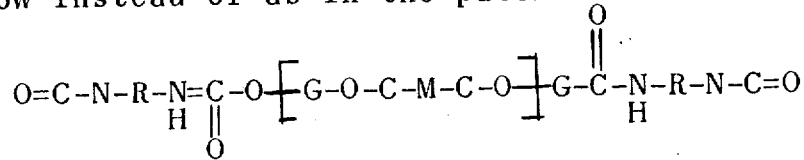

column 7, line 30, for "at" read -- as --.

Signed and sealed this 16th day of October 1962.

(SEAL)
Attest:

ERNEST W. SWIDER
Attesting Officer

DAVID L. LADD
Commissioner of Patents